Figure 1:
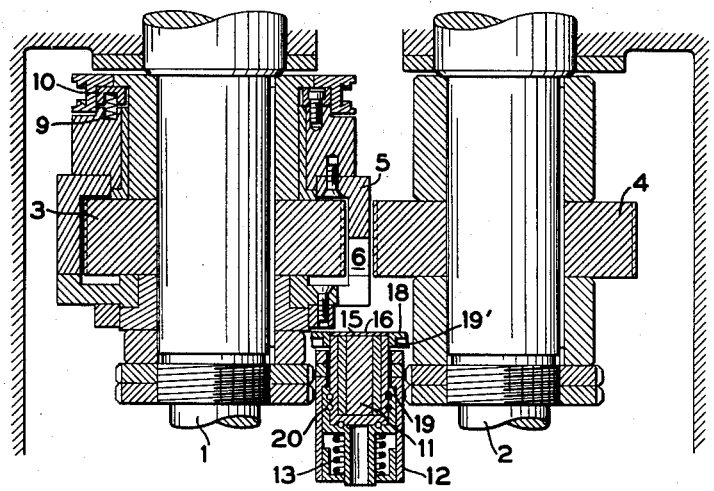

July 15, 1958      J. F. HUBL      2,842,990

FEEDING MECHANISM FOR THREAD ROLLING MACHINES

Filed June 8, 1954

INVENTOR
JOHANN HÜBL

BY *Strauch, Nolan & Diggins*

ATTORNEYS

United States Patent Office 2,842,990
Patented July 15, 1958

2,842,990

FEEDING MECHANISM FOR THREAD ROLLING MACHINES

Johann Franz Hübl, Berlin-Halensee, Germany, assignor, by mesne assignments, to Landis Machine Company, Waynesboro, Pa., a corporation of Pennsylvania Application June 8, 1954, Serial No. 435,337

Claims priority, application Germany August 13, 1953

8 Claims. (Cl. 80—6)

In feeding work pieces from a magazine to the working position between rolling tools it happens that the work pieces tilt, especially if they are short and heavy, and are operated upon in a position out of accurate alignment. When threads are being rolled, therefore, distorted threads result. In case a feeding cylinder, receiving the work pieces in recesses, is used which supports the work piece to be operated upon between the rolling tools instead of a formerly used work rest blade, such errors are also possible, because the initially blank work piece intended for a subsequent thread rolling operation must lie in a larger recess since the diameter of the work piece increases upon being rolled.

The invention is directed to a process for aligning magnetizable work pieces which are preferably fed from a magazine by means of a feeding cylinder and which have end surfaces perpendicular to the longitudinal axis, between rotating rolling tools, especially in thread rolling operations, and is characterized by the fact that the end surfaces of the work pieces, while they are being fed, arrive in a magnetic field and are aligned shortly before and during the working process by means of the magnetic force. The advantage of the process resides in the fact that mechanical alignment of the work pieces is avoided and the work piece is also aligned during the working operation since it can rotate freely in the magnetic field. Transfer of the work pieces into or out of the working position is not hindered by the magnetic field.

The mechanism for carrying out the process, which also constitutes the subject matter of the invention, is characterized by the fact that a magnet is mounted coaxially with the working position of the delivered work pieces and has a plane pole surface perpendicular to its axis and in the plane of transfer in which the end surfaces of the delivered work pieces lie. As soon as the work pieces arrive at the working position, they are attracted and aligned by the plane of the pole surface of the magnet, which is preferably formed as a permanent pot or bar-shaped magnet, and after the operation has been performed, the work pieces are removed as a result of the further rotation of the feeding cylinder. Preferably a thin, flat and magnetizable plate, preferably of spring steel, is mounted at the pole surface of the magnet. This plate is easily removable and, for this purpose, is loosely disposed in an opening in the guide plate which opening corresponds to the thin plate in shape and thickness. The thin plate is attracted by the magnet while the guide plate is fitted to the magnet by a shoulder. The plate may have straight side edges and may for example, be rectangular, square or polygonal so that it cannot rotate in the opening in the guide plate. The work piece, which rotates during the working operation lies against this stationary plate so that the magnet is protected. The plate also has the function of facilitating the introduction and removal of the work piece. When work pieces of larger sizes are involved, it may be advantageous to mount the magnet rotatably and to provide a circular plate at the pole surface of the magnet. In order to prevent a possible variation in work piece length from causing a jam, the magnet is mounted so as to be movable in the axial direction in opposition to a compression spring which presses it against a forward abutment. Further, the housing with the magnet is secured, vertically adjustable, to an abutment bracket in order to facilitate adjustment.

The invention is illustrated in connection with a thread rolling machine. However, it can also be used with other machine tools, grinding machines for example, and is advantageously useful wherever it is important to align work pieces accurately while they are being fed.

Figure 2:
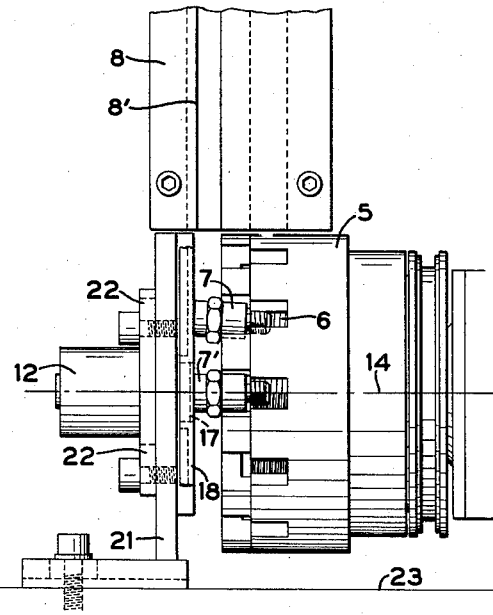

The subject matter of the invention is illustrated in the drawing by an exemplary embodiment. In the drawing:

Figure 1 shows, in section, rolling tools of a thread rolling machine with a magnet mounted in front of the working position; and Figure 2 is a side elevation of the feeding cylinder during the rolling operation.

The rolling tools 3 and 4 are secured in known manner on the operating shafts 1 and 2 of the thread rolling machine. The roll 3 is surrounded by the feeding cylinder 5 which has recesses 6 for receiving the work pieces 7. The work pieces are fed from a magazine (not shown) by the chute 8. The feeding cylinder 5 is driven in known manner by the friction ring 10 provided with springs 9, when a locking means (not shown) is released to feed the next work piece. The feeding cylinder can be locked in the working position during the working operation. But, as is likewise known, it can also move the work pieces slowly through a space between the rolls. As far as the present invention is concerned, the various modes of operation of the feeding cylinder are not important since they have no effect on the magnetic aligning operation.

The pot magnet 11, which is movably guided in the housing 12 against the spring 13, serves as the magnetic aligning means. This magnet is coaxial with the work piece disposed in working position. The axis of the work piece is designated by 14 in Figure 2. This also lies in the plane which passes through the axes of the operating shafts 1 and 2. The thin spring-steel plate 16 lies against the pole surface 15 and is loosely disposed in the opening 17 in the guide plate 18. The guide plate 18 is secured to the magnet by the shoulder 19. The pole surface 15 is flat and is perpendicular to the axis 14. The plate 16 lies in the plane of the track 8' of the feed chute 8 and in the plane of the rectangularly formed end surface 7' of the work piece 7 so that the work piece is attracted endwise and aligned by the magnet.

In order to be able to compensate for small differences in work piece length, the magnet is movable in the housing 12, but is pressed against the frontal abutment 19 by the spring 13. The plate 16 may be rectangular, square or polygonal. It is also possible to use a circular plate. The opening 17 corresponds in shape and thickness to the plate. The magnet can be mounted for rotation in the housing, as indicated by the bearing balls 20. The magnet housing 12 is secured to the abutment bracket 21 and is adjustable vertically by means of the longitudinal slots 22. The bracket is secured to the machine frame 23.

I claim:

1. In apparatus for roll forming work pieces, said apparatus having a pair of rolls rotatable about predetermined axes and forming a rolling station between the adjacent peripheral portions thereof, mechanism for presenting elongated work pieces having an end surface normal to their longitudinal axis to the rolling station with said longitudinal axis of said work piece aligned with the roll axes comprising, a transfer cylinder mounted for rotation in coaxial relation with one of said rolls and having peripheral recesses adapted to loosely carry work pieces from a magazine to said rolling station, and a magnet aligned with said rolling station and having a plane pole surface normal to the roll axes and positioned substantially in the plane of the end surface of a work piece carried by said transfer cylinder whereby work pieces are delivered by said transfer cylinder to the field of said magnet and are aligned thereby during the rolling operation.

2. The apparatus according to claim 1 wherein said magnet is a permanent magnet.

3. The mechanism according to claim 1 together with a flat thin magnetizable plate mounted at said pole surface of said magnet.

4. Mechanism according to claim 1 together with a guide plate fitted to said magnet, said guide plate having a central opening, and a flat thin magnetizable plate mounted in said opening and held in place by said magnet.

5. Apparatus according to claim 1 together with means mounting said magnet for rotation about an axis parallel to the roll axes.

6. Apparatus according to claim 1 together with means mounting said magnet for movement along an axis parallel to the roll axes.

7. Apparatus according to claim 6 together with resilient means biasing said magnet axially toward said rolling station.

8. In apparatus for roll forming work pieces, said apparatus having a pair of rolls rotatable about predetermined axes and forming a rolling station between the adjacent peripheral portions thereof, mechanism for presenting elongated work pieces having an end surface normal to their longitudinal axis to the rolling station with said longitudinal axis of said work piece aligned with the roll axes comprising, a transfer cylinder mounted for rotation in coaxial relation with one of said rolls and having peripheral recesses adapted to loosely carry work pieces from a magazine to said rolling station, a magnet having a plane surface adapted to attract and engage said end surface of said work piece, and means mounting said magnet for rotary and axial movement about and along an axis parallel with said roll axes and substantially in the plane of the end surface of a work piece carried by said transfer cylinder whereby work pieces are delivered by said transfer cylinder to the field of said magnet and are aligned thereby during the rolling operation.

References Cited in the file of this patent

UNITED STATES PATENTS

| | | |
|---|---|---|
| 622,475 | Hubbell | Apr. 4, 1899 |
| 1,107,621 | Landis | Aug. 18, 1914 |
| 2,048,265 | Hatebur | July 21, 1936 |
| 2,063,939 | Lott | Dec. 15, 1936 |
| 2,596,109 | Abbott | May 13, 1952 |

FOREIGN PATENTS

| | | |
|---|---|---|
| 495,407 | Belgium | Aug. 16, 1950 |
| 906,090 | Germany | Mar. 11, 1954 |